United States Patent
Alastalo et al.

(10) Patent No.: US 9,745,397 B2
(45) Date of Patent: *Aug. 29, 2017

(54) MULTISTAGE PROCESS FOR PRODUCING LOW-TEMPERATURE RESISTANT POLYPROPYLENE COMPOSITIONS

(71) Applicants: BOREALIS AG, Vienna (AT); ABU DHABI POLYMERS CO. LTD (BOROUGE) L.L.C., Abu Dhabi (AE)

(72) Inventors: Kauno Alastalo, Porvoo (FI); Pauli Leskinen, Helsinki (FI); Cristian Hedesiu, Abu Dhabi (AE); Johanna Lilja, Kirkkokatu (FI)

(73) Assignees: Borealis AG, Vienna (AT); Abu Dhabi Polymers Co. Ltd (Borouge) L.L.C., Abu Dhabi (AE)

( * ) Notice: Subject to any disclaimer, the term of this patent is extended or adjusted under 35 U.S.C. 154(b) by 0 days.

This patent is subject to a terminal disclaimer.

(21) Appl. No.: 14/786,430

(22) PCT Filed: Apr. 22, 2014

(86) PCT No.: PCT/EP2014/001071
§ 371 (c)(1),
(2) Date: Oct. 22, 2015

(87) PCT Pub. No.: WO2014/173532
PCT Pub. Date: Oct. 30, 2014

(65) Prior Publication Data
US 2016/0194419 A1    Jul. 7, 2016

(30) Foreign Application Priority Data

Apr. 22, 2013 (EP) ................................. 13002097

(51) Int. Cl.
| | | |
|---|---|---|
| C08F 210/16 | (2006.01) | |
| C08L 23/12 | (2006.01) | |
| C08L 23/14 | (2006.01) | |
| C08K 13/02 | (2006.01) | |

(52) U.S. Cl.
CPC ............ *C08F 210/16* (2013.01); *C08K 13/02* (2013.01); *C08L 23/12* (2013.01); *C08L 23/142* (2013.01); *C08L 2203/18* (2013.01); *C08L 2205/025* (2013.01); *C08L 2308/00* (2013.01)

(58) Field of Classification Search
CPC ....... C08F 210/16; C08K 13/02; C08L 23/12; C08L 23/142; C08L 2203/18; C08L 2205/025; C08L 2308/00
See application file for complete search history.

(56) References Cited

U.S. PATENT DOCUMENTS

| | | |
|---|---|---|
| 3,242,150 A | 3/1966 | Scoggin |
| 3,324,093 A | 6/1967 | Alleman |
| 3,374,211 A | 3/1968 | Marwil et al. |
| 3,405,109 A | 10/1968 | Rohlfing |
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,311 A | 7/1985 | Fulks et al. |
| 4,532,313 A | 7/1985 | Matlack |
| 4,543,399 A | 9/1985 | Jenkins, III et al. |
| 4,560,671 A | 12/1985 | Gross et al. |
| 4,578,879 A | 4/1986 | Yokoyama et al. |
| 4,581,342 A | 4/1986 | Johnson et al. |
| 4,582,816 A | 4/1986 | Miro |
| 4,621,952 A | 11/1986 | Aronson |
| 4,657,882 A | 4/1987 | Karayannis et al. |
| 4,803,251 A | 2/1989 | Goode et al. |
| 4,855,370 A | 8/1989 | Chirillo et al. |

(Continued)

FOREIGN PATENT DOCUMENTS

| | | |
|---|---|---|
| EP | 0045975 A2 | 2/1982 |
| EP | 0045976 A2 | 2/1982 |
| EP | 0045977 A2 | 2/1982 |
| EP | 0047077 A1 | 3/1982 |
| EP | 0188125 A2 | 7/1986 |
| EP | 0250169 A2 | 12/1987 |
| EP | 0372239 A2 | 6/1990 |
| EP | 0479186 A2 | 4/1992 |
| EP | 0560035 A1 | 9/1993 |
| EP | 0579426 A1 | 1/1994 |

(Continued)

OTHER PUBLICATIONS

International Preliminary Report on Patentability Application No. PCT/EP2014/00107 dated Oct. 25, 2015.

(Continued)

*Primary Examiner* — Nathan M Nutter

(74) *Attorney, Agent, or Firm* — Roberts Mlotkowski Safran Cole & Calderon, PC

(57) ABSTRACT

A process for polymerizing propylene in the presence of a polymerization catalyst by copolymerizing propylene with a comonomer selected from the group of ethylene and C4-C10 alpha-olefins in three polymerization stages. The polymer produced in the first polymerization stage has the highest melt flow rate and the lowest content of comonomer. The polymer produced in the last polymerization stage has the lowest melt flow rate and the highest content of comonomer. The polymer composition produced by the process has good mechanical properties and can be used for making pipes. The process has a good productivity.

16 Claims, No Drawings

(56) References Cited

U.S. PATENT DOCUMENTS

| | | |
|---|---|---|
| 4,933,149 A | 6/1990 | Rhee et al. |
| 5,026,795 A | 6/1991 | Hogan |
| 5,391,654 A | 2/1995 | Ahvenainen et al. |
| 5,539,067 A | 7/1996 | Parodi et al. |
| 5,618,771 A | 4/1997 | Parodi et al. |
| 2009/0131586 A1* | 5/2009 | Alastalo .............. C08L 23/12 525/52 |
| 2016/0060441 A1* | 3/2016 | Hedesiu et al. ........ C08L 23/14 428/36.9 |
| 2016/0075865 A1* | 3/2016 | Hedesiu et al. ........ C08L 23/14 428/36.9 |

FOREIGN PATENT DOCUMENTS

| | | |
|---|---|---|
| EP | 0600414 A1 | 6/1994 |
| EP | 0607703 A1 | 7/1994 |
| EP | 0683176 A1 | 11/1995 |
| EP | 0684871 | 12/1995 |
| EP | 0696293 | 2/1996 |
| EP | 0699213 | 3/1996 |
| EP | 0721798 A2 | 7/1996 |
| EP | 0707513 B1 | 9/1998 |
| EP | 0887379 A1 | 12/1998 |
| EP | 0887380 A1 | 12/1998 |
| EP | 0887381 A1 | 12/1998 |
| EP | 0891990 A2 | 1/1999 |
| EP | 0991684 | 4/2000 |
| EP | 1028984 | 8/2000 |
| EP | 1028985 | 8/2000 |
| EP | 1030878 | 8/2000 |
| EP | 1310295 A1 | 5/2003 |
| EP | 1415999 A1 | 5/2004 |
| EP | 1591460 A1 | 11/2005 |
| EP | 1724289 A1 | 11/2006 |
| EP | 1860125 A1 | 11/2007 |
| EP | 2361950 A1 | 8/2011 |
| EP | 2368937 A1 | 9/2011 |
| EP | 2415831 A1 | 2/2012 |
| GB | 1272778 | 5/1972 |
| GB | 1580635 | 12/1980 |
| WO | 8707620 A1 | 12/1987 |
| WO | 9219653 A1 | 11/1992 |
| WO | 9219658 A1 | 11/1992 |
| WO | 9219659 A1 | 11/1992 |
| WO | 9221705 A1 | 12/1992 |
| WO | 9311165 A1 | 6/1993 |
| WO | 9311166 A1 | 6/1993 |
| WO | 9319100 A1 | 9/1993 |
| WO | 9425495 A1 | 11/1994 |
| WO | 9532994 A1 | 12/1995 |
| WO | 9736939 A1 | 10/1997 |
| WO | 9740080 A1 | 10/1997 |
| WO | 9812234 A1 | 3/1998 |
| WO | 9933842 A1 | 7/1999 |
| WO | 0029452 A1 | 5/2000 |
| WO | 02088194 A1 | 11/2002 |
| WO | 03000754 A2 | 1/2003 |
| WO | 03000755 A1 | 1/2003 |
| WO | 03000756 A1 | 1/2003 |
| WO | 03000757 A1 | 1/2003 |
| WO | 2004029112 A1 | 4/2004 |
| WO | 2005087361 A1 | 9/2005 |
| WO | 2007025640 A1 | 3/2007 |

OTHER PUBLICATIONS

Geldart et al.: The Design of Distributors for Gas-Fluidized Beds, Powder Technology, 1985; vol. 42.

Geldart: Gas Fluidization Technology, J.Wiley & Sons, 1986; p. 17-18, 169-186, 183.

International Search Report and Written Opinion of PCT/EP2014/001071 dated May 21, 2014.

* cited by examiner

MULTISTAGE PROCESS FOR PRODUCING LOW-TEMPERATURE RESISTANT POLYPROPYLENE COMPOSITIONS

FIELD OF THE INVENTION

The present invention is directed to a method of producing propylene polymers. Especially, the present method is directed to a method of producing propylene copolymers having a broad molecular weight distribution. In particular, the present method is directed to a method of polymerizing propylene with comonomers in at least three stages. The resulting polymers are well suited for producing pipes.

Problem to be Solved

It is known in the art to polymerize propylene in two or more stages to produce resins useful for making pipes, for instance, from WO-A-1997040080 and EP-A-887380. Such methods often produce a high molecular weight copolymer in a first polymerization stage and a low molecular weight copolymer in a subsequent polymerization step.

Such methods have a disadvantage in that for some polymerization catalysts the activity of the catalyst is reduced when the polymerization is conducted at a low hydrogen concentration. On the other hand, the activity increases when the hydrogen concentration is increased. This puts limits to the relative amount of the high molecular weight component in the final composition. Alternatively, the increase of the relative amount of the high molecular weight component in the composition can be done only by reducing the overall polymer production rate.

It is also known to produce polypropylene compositions in three or more stages, for instance from EP-A-2415831, EP-A-2368937 and EP-A-2361950.

The objective of the present invention is thus to overcome the problems of prior art processes and to provide a process which allows the production of propylene copolymer compositions containing an increased amount of high molecular weight component.

Especially, the objective is to provide a process which allows the production of polypropylene compositions having improved mechanical properties at a high production rate and/or high catalyst productivity.

SUMMARY OF THE INVENTION

As seen from one aspect, the present invention provides a process for polymerizing propylene in the presence of a polymerization catalyst comprising (I) a solid catalyst component comprising a magnesium halide, a titanium halide and an internal electron donor; and (II) a cocatalyst comprising an aluminium alkyl and optionally an external electron donor, said process comprising the steps of:
(A) continuously polymerizing propylene, optionally together with a comonomer selected from the group of ethylene and C4-C10 alpha-olefins, in a first polymerization stage by introducing streams of propylene, hydrogen and optionally said comonomer into the first polymerization stage at a temperature of from 60 to 100° C. and a pressure of from 10 to 100 bar to produce a first polymer of propylene and a first fluid reaction mixture wherein the first polymer has a melt flow rate $MFR_2$ of from 0.3 to 5.0 g/10 min;
(B) continuously withdrawing from the first polymerization stage a stream comprising the first polymer of propylene and passing it into a second polymerization stage;
(C) continuously polymerizing propylene in the presence of said first polymer of propylene in the second polymerization stage at a temperature of from 65 to 100° C. and a pressure of from 10 to 100 bar by introducing streams of propylene, hydrogen, and a comonomer selected from the group of ethylene and C4-C10 alpha-olefins, to produce a first polymer mixture of said first polymer of propylene and a second copolymer of propylene, said first polymer mixture comprising from 35 to 60% by weight of said first polymer and from 40 to 65% by weight of said second copolymer wherein the first polymer mixture has a melt flow rate $MFR_2$ of 0.05 to 0.6 g/10 min and wherein the melt flow rate $MFR_2$ of said first polymer mixture is smaller than the melt flow rate $MFR_2$ of said first polymer;
(D) continuously withdrawing a stream comprising the first polymer mixture from the second polymerization stage and passing it into a third polymerization stage;
(E) continuously polymerizing propylene and the comonomer in the presence of the first polymer mixture in the third polymerization stage at a temperature of from 65 to 100° C. and a pressure of from 10 to 100 bar by introducing streams of propylene, hydrogen, and the comonomer, to produce a second copolymer mixture comprising the first polymer mixture and a third copolymer of propylene wherein the second copolymer mixture has a melt flow rate $MFR_2$ of 0.05 to 0.4 g/10 min and a content of comonomer units of from 4.5 to 15% by mole; wherein the second copolymer mixture comprises from 75 to 98% by weight of said first polymer mixture and from 2 to 25% by weight of said third copolymer and wherein the melt flow rate $MFR_2$ of the second copolymer mixture is smaller than the melt flow rate $MFR_2$ of said first polymer mixture and the ratio of the content of the comonomer units in the first polymer mixture to the content of the comonomer units in the second copolymer mixture, both expressed in mol-%, is from 0.50 to 0.96;
(F) continuously withdrawing a stream comprising the second copolymer mixture from the third polymerization stage and optionally mixing the second copolymer mixture with additives; and
(G) extruding the second polymer mixture into pellets.

As seen from another aspect, the present invention provides a process for producing pipes comprising the steps of:
polymerizing propylene in the process according to any one of claims 1 to 15; and
extruding the polymer to a pipe.

DETAILED DESCRIPTION

Even though the present invention relates to a three-stage process for producing polypropylene compositions it should be understood that the process may contain additional polymerization stages to the three stages disclosed above. It may contain additional polymerization stages, such as a prepolymerization stage, as long as the polymer produced in such additional stages does not substantially influence the properties of the polymer. Furthermore, either one or both of the two polymerization stages disclosed above may be conducted as two or more sub-stages, provided that the polymer produced in each such sub-stage as well as their mixture matches the description for the polymer for the respective stage. However, it is preferred to conduct each of the first, second and third polymerization stage as a single polymerization stage in order to prevent the process from becoming unnecessarily complex. Therefore, in the most preferred embodiment the process consists of three polymerization stages which may be preceded a prepolymerization stage.

The present invention is directed to producing copolymers of propylene and a comonomer selected from the group consisting of ethylene and alpha-olefins having from 4 to 10 carbon atoms. Preferably the comonomer is selected from the group of ethylene and alpha-olefins having from 4 to 8 carbon atoms. Especially preferably the comonomer is ethylene.

Catalyst

The polymerisation can be carried out in the presence of a metallocene catalyst or Ziegler-Natta-type catalyst, the latter is in particular preferred.

A Ziegler-Natta type catalyst typically used in the present invention for propylene polymerization is stereospecific, high yield Ziegler-Natta catalyst comprising as essential components Mg, Ti, Al and Cl. This type of catalysts comprise typically in addition to a solid transition metal (like Ti) component a cocatalyst(s) as well external donor(s) as stereoregulating agent.

These compounds may be supported on a particulate support, such as inorganic oxide, like silica or alumina, or, usually, the magnesium halide may form the solid support. It is also possible that solid catalysts are self supported, i.e. the catalysts are not supported on an external support, but are prepared via emulsion-solidification method.

The solid transition metal component usually also comprises an electron donor (internal electron donor). Suitable internal electron donors are, among others, esters of carboxylic acids, like phthalates, citraconates, and succinates. Also oxygen- or nitrogen-containing silicon compounds may be used.

The cocatalyst used in combination with the transition metal compound typically comprises an aluminium alkyl compound. The aluminium alkyl compound is preferably trialkyl aluminium such as trimethylaluminium, triethylaluminium, tri-isobutyl aluminium or tri-n-octylaluminium. However, it may also be an alkyl aluminium halide, such as diethyl aluminium chloride, dimethylaluminium chloride and ethylaluminium sesquichloride. Triethylaluminium is an especially preferred aluminium alkyl compound. The aluminium alkyl is preferably introduced to reach a desired ratio of the aluminium to titanium. Suitable ratios depend on the catalyst and lie within the range of from 30 to 1000 mol/mol, such as 50 to 600 mol/mol.

Preferably the catalyst also comprises an external electron donor. Suitable electron donors known in the art include ethers, ketones, amines, alcohols, phenols, phosphines and silanes. Silane type external donors are typically organosilane compounds containing Si—OCOR, Si—OR, or Si—$NR_2$ bonds, having silicon as the central atom, and R is an alkyl, alkenyl, aryl, arylalkyl or cycloalkyl with 1-20 carbon atoms are known in the art. Organosilane compounds are preferred external donors, with dicyclopentyldimethoxysilane and cyclohexylmethyldimethoxysilane being especially preferred. The organosilane compound is typically introduced to keep a desired ratio aluminium alkyl and the silane compound, such as from 3 to 20 or from 4 to 10.

Examples of suitable catalysts and compounds in catalysts are shown in among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, WO 92/19659, WO 92/19653, WO 92/19658, U.S. Pat. No. 4,382,019, U.S. Pat. No. 4,435,550, U.S. Pat. No. 4,465,782, U.S. Pat. No. 4,473,660, U.S. Pat. No. 4,560,671, U.S. Pat. No. 5,539,067, U.S. Pat. No. 5,618,771, EP45975, EP45976, EP45977, WO 95/32994, U.S. Pat. No. 4,107,414, U.S. Pat. No. 4,186,107, U.S. Pat. No. 4,226,963, U.S. Pat. No. 4,347,160, U.S. Pat. No. 4,472,524, U.S. Pat. No. 4,522,930, U.S. Pat. No. 4,530,912, U.S. Pat. No. 4,532,313, U.S. Pat. No. 4,657,882, U.S. Pat. No. 4,581,342 and U.S. Pat. No. 4,657,882.

The catalyst is preferably modified by prepolymerizing a vinyl compound in the presence of the catalyst so that the modified catalyst contains up to 5 grams of prepolymer per gram of solid catalyst component. Preferably, the vinyl compound has the formula $CH_2=CH—CHR_6R_7$, wherein $R_6$ and $R_7$ together form a 5- or 6-membered saturated, unsaturated or aromatic ring or independently represent an alkyl group comprising 1 to 4 carbon atoms. Most preferably the vinyl compound is vinylcyclohexane. Especially preferably the catalyst contains from 0.1 to 2 grams of poly(vinylcyclohexane) per one gram of solid catalyst component. This allows the preparation of nucleated polypropylene as disclosed in EP 607703, EP 1028984, EP 1028985 and EP 1030878.

Prepolymerization

In a preferred embodiment the first polymerization stage is preceded by a prepolymerization stage. The prepolymerization is conducted in a continuous manner as bulk slurry polymerization in liquid propylene, i.e. the liquid phase mainly comprises propylene, with minor amount of other reactants and optionally inert components dissolved therein. Preferably the prepolymerization is conducted in a continuous stirred tank reactor or a loop reactor.

The prepolymerization reaction is typically conducted at a temperature of 0 to 60° C., preferably from 10 to 50° C.

The pressure in the prepolymerization reactor is not critical but must be sufficiently high to maintain the reaction mixture in liquid phase. Thus, the pressure may be from 20 to 100 bar, for example 30 to 70 bar.

The reaction conditions are well known in the art as disclosed, among others, in GB 1580635.

In the prepolymerization step it is also possible to feed comonomers into the prepolymerization stage. Examples of suitable comonomers are ethylene or alpha-olefins having from 4 to 10 carbon atoms. Especially suitable comonomers are ethylene, 1-butene, 1-hexene, 1-octene or their mixtures.

The amount of polymer produced in the prepolymerization stage does not exceed 5% by weight of the amount of the total polymer, preferably it does not exceed 3% by weight of the amount of the total polymer and in particular it does not exceed 2% by weight or even 1% by weight of the amount of the total polymer produced in the polymerization stages.

First Polymerization Stage

In the first polymerization stage a first polymer of propylene is produced. This is done by introducing a polymerization catalyst, preferably through the prepolymerization stage as disclosed above, into the first polymerization stage together with monomer mixture containing propylene and optionally a comonomer selected from ethylene and alpha-olefins containing 4 to 10 carbon atoms. The content of the comonomer, if present, is controlled to obtain a desired comonomer content in the first copolymer. Preferably the first polymer is a first copolymer and it contains from 0.1 to 6% by mole of units derived from the comonomer and from 94 to 99.9% by mole of propylene units. More preferably, the first copolymer contains from 0.5 to 5% by mole of units derived from the comonomer and from 95 to 99.5% by mole of propylene units.

The first polymer of propylene has a melt index $MFR_2$ of from 0.3 to 5.0 g/10 min. Preferably the melt index $MFR_2$ of the first copolymer is from 0.3 to 3 g/10 min and more preferably from 0.35 to 2 g/10 min. It is important that the melt index of the first copolymer remains within these limits. If the melt index is higher, then a high amount of hydrogen would be needed to reach the melt index and a separation step to remove hydrogen would be needed. Otherwise it would not be possible to reach the desired melt index in the second polymerization stage. On the other hand, a too low melt index of the first copolymer would lead to an insufficiently narrow molecular weight distribution and thus unacceptable polymer properties.

As indicated by the comonomer content the first polymer is semicrystalline and not amorphous. The fraction of xylene soluble polymer at 25° C. in the first polymer does not exceed 20% by weight, preferably not 15% by weight and in particular not 10% by weight. Typically the fraction of xylene soluble polymer in the first polymer is at least 1%, preferably at least 2% by weight.

The polymerization in the first polymerization zone is preferably conducted in slurry in a loop reactor. Then the polymer particles formed in the polymerization, together with the catalyst fragmented and dispersed within the particles, are suspended in a fluid hydrocarbon. The slurry is agitated to enable the transfer of reactants from the fluid into the particles. In loop reactors the slurry is circulated with a high velocity along a closed pipe by using a circulation pump. Loop reactors are well known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

Slurry polymerization is preferably a so called bulk polymerization. By "bulk polymerization" is meant a process where the polymerization is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerization, the inert components tend to accumulate, and thus the reaction medium may comprise up to 40% by weight of other compounds than monomer. It is to be understood, however, that such a polymerization process is still within the meaning of "bulk polymerization", as defined above.

The temperature in the slurry polymerization is typically from 60 to 100° C., preferably from 60 to 75° C. and in particular from 65 to 72° C. The pressure is from 10 to 100 bar, preferably from 25 to 80 bar. The pressure is normally selected so that it is higher than the vapour pressure of the fluid reaction mixture at the selected operation temperature.

Hydrogen is usually introduced into the reactor for controlling the molecular weight, or the melt index, of the first polymer. Typically hydrogen is introduced to maintain a constant molar ratio of hydrogen to propylene within the reactor. It has been found for certain catalysts that when the ratio of hydrogen to propylene is within the range of from 0.1 to 4.0 mol/kmol (or, mol/1000 mol), preferably from 0.3 to 3.0 mol/kmol, the $MFR_2$ of the first polymer is within the limits required for the present invention.

Comonomer is introduced to reach the desired content of comonomer units in the polymer. The actual amount of the comonomer that is needed depends on the type of comonomer (for instance, ethylene is more reactive than the higher olefins) and on the type of catalyst. When ethylene is used as a comonomer, then good results have been obtained by feeding ethylene so that the molar ratio of ethylene to propylene within the reactor is within the range of from 1 to 30 mol/kmol, preferably from 3 to 10 mol/kmol.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerization stage other components are also introduced as it is known in the art. Thus, hydrogen is used to control the molecular weight of the polymer. Process additives, such as antistatic agent, may be introduced into the reactor to facilitate a stable operation of the process.

According to a preferred embodiment of the present invention the slurry is conducted directly into a subsequent gas phase polymerization zone. By "directly" it is meant that the slurry is introduced from the loop reactor into the gas phase reactor without a flash step between the slurry and gas phase polymerization stages for removing at least a part of the reaction mixture from the polymer. This kind of direct feed is described in EP-A-887379, EP-A-887380, EP-A-887381 and EP-A-991684. It is thus preferred that the whole slurry stream withdrawn from the loop reactor is directed into the gas phase reactor. There is thus no separation step between the reactors. However, it is within the scope of this preferred embodiment to take small samples or sample streams from the polymer or from the fluid phase or from both for analyzing the polymer and/or the composition of the reaction mixture. As understood by the person skilled in the art, the volume of such sample streams is small compared to the total slurry stream withdrawn from the loop reactor and typically much lower than 1% by weight of the total stream, such as at most 0.1% or 0.01% or even 0.001% by weight of the total stream.

Second Polymerization Stage

In the second polymerization stage a first polymer mixture comprising the first polymer of propylene and a second polymer of propylene is formed. This is done by introducing the particles of the first polymer, containing active catalyst dispersed therein, together with additional propylene and optionally comonomer into the second polymerization stage. Hydrogen is introduced for controlling the molecular weight. This causes the second polymer to form on the particles containing the first polymer.

The melt index $MFR_2$ of the first polymer mixture is from 0.05 to 1.0 g/10 min. Preferably the melt index $MFR_2$ of the first polymer mixture is from 0.1 to 0.5 g/10 min, more preferably from 0.1 to 0.4 g/10 min. Furthermore, the melt index of the first polymer mixture is lower than the melt index of the first polymer. Preferably, the ratio of the melt index of the first polymer mixture to the melt index of the first polymer, $MFR_{2,b1}/MFR_{2,1}$, has a value of not higher than 0.8, more preferably not higher than 0.7 and in particular not higher than 0.6. Typically the ratio is not smaller than 0.2.

As it is well known in the art the melt index $MFR_2$ of the second polymer produced in the second polymerization stage cannot be directly measured because the second polymer cannot be isolated from the first polymer mixture. However, by knowing the weight fractions of the polymer and the melt indices of the first polymer and the first polymer mixture it is possible to calculate the MFR$_2$ of the second polymer. This can be done by using the equation $$MI_b = (w_1 \cdot MI_1^{-0.0965} + w_2 \cdot MI_2^{-0.0965})^{-\frac{1}{0.0965}} \quad \text{(eq. 1)}$$

Where w is the weight fraction of the component in the mixture, MI is the melt index MFR$_2$ and subscripts b, 1 and 2 refer to the mixture, component 1 and component 2, respectively. By calculating the MFR$_2$ of the second polymer it can be found to lie within the range of from 0.04 to 0.6 g/10 min, preferably 0.06 to 0.25 g/10 min.

The comonomer is selected from ethylene and alpha-olefins containing 4 to 10 carbon atoms. The comonomer used in the second polymerization stage may be the same as or different from the comonomer used in the first polymerization stage. Preferably the same comonomer is used in the first and the second polymerization stages. Especially preferably, the comonomer used in both the first and second polymerization stages is ethylene.

The content of the comonomer in the second polymerization stage is controlled to obtain the desired comonomer content of the first copolymer mixture. Typically the first copolymer mixture contains from 2 to 12% by mole of units derived from the comonomer and from 88 to 98% by mole of propylene units. Preferably the first copolymer mixture contains from 4 to 10% by mole of units derived from the comonomer and from 90 to 96% by mole of propylene units. Furthermore, the comonomer content of the first copolymer mixture is higher than the comonomer content of the first copolymer. Preferably the ratio of the comonomer content of the first copolymer to the comonomer content of the copolymer mixture (both expressed in mol-%), $C_1/C_{b1}$, is not higher than 0.98, more preferably not higher than 0.9 and especially preferably not higher than 0.85. Typically the ratio is not smaller than 0.4.

Preferably the ratio $C_1/C_{b1}$ is not higher than 0.98 and the ratio MFR$_{2,b1}$/MFR$_{2,1}$ is not higher than 0.8; more preferably the ratio $C_1/C_{b1}$ is not higher than 0.9 and the ratio MFR$_{2,b1}$/MFR$_{2,1}$ is not higher than 0.7; and in particular the ratio $C_1/C_{b1}$ is not higher than 0.9 and the ratio MFR$_{2,b1}$/MFR$_{2,1}$ is not higher than 0.6.

The comonomer content of the second copolymer cannot be directly measured. However, by using the standard mixing rule it can be calculated from the comonomer contents of the first copolymer mixture and the first copolymer.

$$C_b = w_1 \cdot C_1 + w_2 \cdot C_2 \quad \text{(eq. 2)}$$

where C is the content of comonomer in weight-%, w is the weight fraction of the component in the mixture and subscripts b, 1 and 2 refer to the overall mixture, component 1 and component 2, respectively. The second copolymer can then be found to contain 4 to 12% by mole of units derived from the comonomer and from 88 to 96% by mole of propylene units. More preferably, the second copolymer contains from 4 to 10% by mole of units derived from the comonomer and from 90 to 96% by mole of propylene units.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \quad \text{(eq. 3)}$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

As indicated by the comonomer content the second polymer is semicrystalline and not amorphous. The fraction of xylene soluble polymer at 25° C. in the first polymer mixture does not exceed 20% by weight, preferably not 15% by weight. Typically the fraction of xylene soluble polymer in the first polymer mixture is at least 1%, preferably at least 2% by weight.

The content of the xylene soluble polymer in the second polymer cannot be directly measured. The amount can be estimated, however, by using the standard mixing rule:

$$XS_b = w_1 \cdot XS_1 + w_2 \cdot XS_2 \quad \text{(eq. 4)}$$

where XS is the content of xylene soluble polymer in weight-%, w is the weight fraction of the component in the mixture and subscripts b, 1 and 2 refer to the overall mixture, component 1 and component 2, respectively. The second polymer typically can be found to have a content of xylene soluble polymer of not higher than 20% by weight, preferably not higher than 15% by weight. Typically the fraction of xylene soluble polymer in the second polymer is at least 1%, preferably at least 5% by weight.

The first polymer mixture comprises from 30 to 60% by weight of the first polymer and from 40 to 70% by weight of the second polymer. Preferably, the first polymer mixture comprises from 33 to 50% by weight of the first polymer and from 50 to 67% by weight of the second polymer. As discussed above, preferably the first polymer mixture is a first copolymer mixture and preferably the first and second polymers are copolymers.

The second polymerization stage is preferably conducted in a fluidized bed gas phase reactor.

It is often necessary to introduce additional hydrogen into the second polymerization stage to control the melt index of the copolymer mixture. Suitably, the hydrogen feed is controlled to maintain constant hydrogen to propylene ratio in the fluidization gas. The actual ratio depends on the catalyst. Good results have been obtained by maintaining the ratio within the range of from 0.1 to 4 mol/kmol, preferably from 0.5 to 3 mol/kmol.

Even though the actual comonomer to monomer ratio depends on the type of the comonomer and the type of the catalyst used in the process the composition of the monomer and comonomer feeds is suitably adjusted so that the fluidization gas has a ratio of ethylene to propylene of about 10 to 100 mol/kmol (or, mol/1000 mol), preferably from 15 to 70 mol/kmol. Such ratios have been found to yield good results for some catalysts.

In a fluidized bed gas phase reactor olefins are polymerized in the presence of a polymerization catalyst in an upwards moving gas stream. The reactor typically contains a fluidized bed comprising the growing polymer particles containing the active catalyst, said fluidized bed having its base above a fluidization grid and an upper level within the gas phase reactor.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components are typically continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the transport velocity, as otherwise the whole bed would be entrained with the fluidization gas. The bed voidage then is then typically less than 0.8, preferably less than 0.75 and more preferably less than 0.7. Generally the bed voidage is at least 0.6. An overview is given, among others in Geldart: Gas Fluidization Technology, J. Wiley & Sons, 1986 in chapters 2.4 and 2.5 (pages 17-18) as well as in chapters 7.3 to 7.5 (pages 169-186, especially FIG. 7.21 on page 183).

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level, i.e., the upper level, may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

The fluidized bed polymerization reactor is operated at a temperature within the range of from 65 to 100° C., preferably from 65 to 85° C. The pressure is suitably from 10 to 100 bar, preferably from 15 to 30 bar.

Third Polymerization Stage

In the third polymerization stage a second copolymer mixture comprising the first polymer mixture and a third copolymer of propylene is formed. This is done by introducing the particles of the first polymer mixture, containing active catalyst dispersed therein, together with additional propylene and a comonomer into the third polymerization stage. Hydrogen may be introduced for controlling the molecular weight. This causes the third polymer to form on the particles containing the first polymer mixture.

The melt index $MFR_2$ of the second copolymer mixture is from 0.05 to 1.0 g/10 min, preferably from 0.1 to 0.5 g/10 min. The melt index of the second copolymer mixture is lower than the melt index of the first polymer mixture. Preferably, the ratio of the melt index $MFR_2$ of the second copolymer mixture to the melt index $MFR_2$ of the first polymer mixture is at most 0.95 and more preferably at most 0.9. Typically the ratio is not less than 0.4, such as not less than 0.5.

As explained above for the first polymer mixture, the $MFR_2$ of the third copolymer of propylene cannot be measured because the third copolymer cannot be isolated from the second copolymer mixture. However, the $MFR_2$ of the third copolymer of propylene can be calculated by using equation 1 above. In that case the component 1 is the first polymer mixture, component 2 is the third copolymer and the final blend is the second copolymer mixture. It can then be found that $MFR_2$ of the third copolymer is from 0.0001 to 0.1 g/10 min, preferably from 0.001 to 0.08 g/10 min.

Accordingly, the comonomer content of the third copolymer can calculated by using equation 2.

Hydrogen feed is adjusted to achieve a desired melt flow rate (or molecular weight) of the polymer. Suitably, the hydrogen feed is controlled to maintain constant hydrogen to propylene ratio in the reaction mixture. The actual ratio depends on the catalyst as well as the type of the polymerization. Good results have been obtained in gas phase polymerization by maintaining the ratio within the range of from 0.1 to 3 mol/kmol, preferably from 0.2 to 2 mol/kmol.

The comonomer is selected from ethylene and alpha-olefins containing 4 to 10 carbon atoms. The comonomer used in the third polymerization stage may be the same as or different from the comonomer used in the preceding polymerization stages. Preferably the same comonomer is used in all polymerization stages. Ethylene is very suitably used as the comonomer.

The content of the comonomer in the third polymerization stage is controlled to obtain the desired comonomer content of the second copolymer mixture. Typically the second copolymer mixture contains from 4.5 to 15% by mole of units derived from the comonomer and from 88 to 95.5% by mole of propylene units. Preferably the second copolymer mixture contains from 5.0 to 9.0% by mole of units derived from the comonomer and from 91.0 to 95.0% by mole of propylene units. The content of comonomer units in the second copolymer mixture is greater than the content of the comonomer units in the first copolymer mixture.

Preferably the ratio of the content of comonomer units in the first copolymer mixture to the content of the comonomer units in the second copolymer mixture, $C_{b1}/C_{b2}$, where both $C_{b1}$ and $C_{b1}$ are expressed in mole-%, is at most 0.96, such as at most 0.95, more preferably at most 0.90. Typically, the ratio is not less than 0.5, such as not less than 0.55 or 0.6.

Preferably the ratio $C_{b1}/C_{b2}$ is not higher than 0.95 and the ratio $MFR_{2,b2}/MFR_{2,b1}$ is not higher than 0.95; more preferably the ratio $C_{b1}/C_{b2}$ is not higher than 0.95 and the ratio $MFR_{2,b2}/MFR_{2,b1}$ is not higher than 0.90.

As discussed above for the first copolymer mixture the comonomer content of the third copolymer cannot be directly measured. Instead, it can be calculated by using equation 2 above. In that case the component 1 is the first polymer mixture, component 2 is the third polymer and the final blend is the second polymer mixture. The content of the comonomer units in the third copolymer is from 10 to 40% by mole and a content of propylene units of from 60 to 90% by mole. Preferably the content of comonomer units is from 15 to 30% by mole and the content of propylene units of from 70 to 85% by mole.

The comonomer to propylene ratio that is needed to produce the desired comonomer content in the polymer depends, among others, on the type of comonomer and the type of catalyst. With ethylene as a comonomer good results have been obtained in gas phase polymerization with a molar ratio of ethylene to propylene of 50 to 500 mol/kmol, preferably from 100 to 350 mol/kmol.

The fraction of xylene soluble polymer at 25° C. in the second polymer mixture does not exceed 20% by weight, preferably not 15% by weight. Typically the fraction of xylene soluble polymer in the second polymer mixture is at least 2%, preferably at least 3% by weight.

The second polymer mixture comprises from 75 to 98% by weight of the first polymer mixture, preferably from 85 to 95%, and from 2 to 25% by weight of the third polymer, preferably from 5 to 15%. As discussed above, preferably the second polymer mixture is a second copolymer mixture and preferably the first, second and third polymers are copolymers.

The third polymerization stage is preferably conducted in a fluidized bed gas phase reactor as described above.

Extrusion

When the polymer has been removed from the polymerization reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutrailzers, lubricating agents, nucleating agents, pigments and so on.

The polymer particles are mixed with additives and extruded to pellets as it is known in the art. Preferably co-rotating twin screw extruder is used for the extrusion step. Such extruders are manufactured, for instance, by Coperion (Werner & Pfleiderer) and Japan Steel Works.

Pipes are produced according to the methods known in the art the copolymer mixture which has been extruded to pellets as disclosed above. Thus, according to one preferred method the polymer composition is extruded through an annular die to a desired internal diameter, after which the polymer composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube. The tube is cooled by using a jacket or by passing cold water over it.

According to another method a water-cooled extension is attached to the end of the die mandrel. The extension is thermally insulated from the die mandrel and is cooled by water circulated through the die mandrel. The extrudate is drawn over the mandrel which determines the shape of the pipe and holds it in shape during cooling. Cold water is flowed over the outside pipe surface for cooling.

According to still another method the extrudate leaving the die is directed into a tube having perforated section in the centre. A slight vacuum is drawn through the perforation to hold the pipe hold the pipe against the walls of the sizing chamber.

After the sizing the pipe is cooled, typically in a water bath having a length of about 5 meters or more.

Description of Methods

Melt Flow Rate

Melt flow rate (MFR, $MFR_2$) was determined according to ISO 1133 at 230° C. under the load of 2.16 kg.

The melt index $MFR_2$ is herein assumed to follow the following mixing rule (equation 1):

$$MI_b = (w_1 \cdot MI_1^{-0.0965} + w_2 \cdot MI_2^{-0.0965})^{-\frac{1}{0.0965}} \quad \text{(eq. 1)}$$

Where w is the weight fraction of the component in the mixture, MI is the melt index $MFR_2$ and subscripts b, 1 and 2 refer to the mixture, component 1 and component 2, respectively.

Content of Comonomer

Ethylene content, i.e., the content of ethylene units in propylene polymer was measured by Fourier transmission infrared spectroscopy (FTIR). A thin film of the sample (thickness approximately 250 μm) was prepared by hot-pressing. The area of —CH2- absorption peak (800-650 cm$^{-1}$) was measured with Perkin Elmer FTIR 1600-spectrometer. The method was calibrated by ethylene content data measured by $^{13}C$ NMR.

The comonomer content is herein assumed to follow the mixing rule (equation 2):

$$C_b = w_1 \cdot C_1 + W_2 \cdot C_2 \quad \text{(eq. 2)}$$

Where C is the content of comonomer in weight-%, w is the weight fraction of the component in the mixture and subscripts b, 1 and 2 refer to the overall mixture, component 1 and component 2, respectively.

Xylene Soluble

The amount of xylene soluble fraction was determined according to ISO 16152. The amount of polymer which remains dissolved at 25° C. after cooling is given as the amount of xylene soluble polymer.

The content of xylene soluble polymer is herein assumed to follow the mixing rule (equation 4):

$$XS_b = w_1 \cdot XS_1 + w_2 \cdot XS_2 \quad \text{(eq. 4)}$$

Where XS is the content of xylene soluble polymer in weight-%, w is the weight fraction of the component in the mixture and subscripts b, 1 and 2 refer to the overall mixture, component 1 and component 2, respectively.

Charpy Impact Strength

NIS was determined according to ISO 179-1 eA:2000 on V-notched samples of 80×10×4 mm$^3$ at 0° C. The test specimens were prepared by injection moulding using an IM V 60 TECH machinery in line with EN ISO 1873-2 (80*10×4 mm$^3$)

The melt temperature was 200° C. and the mould temperature was 40° C.

Productivity of the Catalyst

The productivity of the catalyst was determined as the amount of polymer produced in the process (in kg/h) divided by the amount of catalyst fed into the process (in g/h).

Flexural Modulus

The flexural test was carried out according to the method of ISO 178 by using injection molded test specimens produced according to EN ISO 1873-2 (80*10×4 mm$^3$).

Flexural Modulus was determined at a cross-head speed of 2 mm/min, flexural strength at a cross head speed of 50 mm/min.

EXAMPLES

Catalyst Preparation

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of diethylhexylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

Prepolymerization with Vinylcyclohexane

Triethylaluminium (TEAL), dicyclopentyldimethoxysilane (DCPDMS) as donor (Do), catalyst as produced above and vinylcyclohexane (VCH) were added into oil, e.g. Technol 68, provided in amounts so that Al/Ti was 3-4 mol/mol, Al/Do was as well 3-4 mol/mol, and weight ratio of VCH/solid catalyst was 1/1. The mixture was heated to 60-65° C. and allowed to react until the content of the unreacted vinylcyclohexane in the reaction mixture was less than 1000 ppm. Catalyst concentration in the final oil-catalyst slurry was 10-20% by weight.

Example 1

A stirred tank reactor having a volume of 45 dm$^3$ was operated as liquid-filled at a temperature of 33° C. and a pressure of 53 bar. Into the reactor was fed propylene so much that the average residence time in the reactor was 0.3 hours together with 1.1 g/h hydrogen and 1.4 g/h of a polymerization catalyst prepared according to Catalyst Preparation Example above with triethyl aluminium (TEA) as a cocatalyst and dicyclopentyldimethoxysilane (DCP-DMS) as external donor so that the molar ratio of TEA/Ti was about 740 mol/mol and TEA/DCPDMS was 13 mol/mol. The slurry from this prepolymerization reactor was directed to a loop reactor having a volume of 150 dm$^3$ together with 190 kg/h of propylene, 2.3 kg/h ethylene and hydrogen so that the molar ratio of hydrogen to propylene was 0.53 mol/kmol. The loop reactor was operated at a temperature of 72° C. and a pressure of 53 bar. The production rate of propylene copolymer was 28 kg/h, the ethylene content of the copolymer was 3.1% by weight and the melt flow rate $MFR_2$ was 0.87 g/10 min.

The polymer slurry from the loop reactor was directly conducted into a first gas phase reactor operated at a temperature of 80° C. and a pressure of 29 bar. Into the reactor were fed additional propylene, ethylene and hydrogen, as well as nitrogen as inert gas, so that the content of propylene was 88% by mole, the ratio of ethylene to propylene was 33 mol/kmol and the ratio of hydrogen to propylene was 1.9 mol/kmol. The production rate in the reactor was 40 kg/h and the polymer withdrawn from the reactor had a melt flow rate $MFR_2$ of 0.36 g/10 min and an ethylene content of 3.7% by weight. The split of the polymer produced in the loop reactor to the polymer produced in the first gas phase reactor was 41:59.

The polymer from the first gas phase reactor was conducted into a second gas phase reactor operated at a temperature of 80° C. and a pressure of 24 bar. Into the reactor were fed additional propylene, ethylene and hydrogen, as well as nitrogen as inert gas, so that the content of propylene was 76% by mole, the ratio of ethylene to propylene was 50 mol/kmol and the ratio of hydrogen to propylene was 0.47 mol/kmol. The production rate in the reactor was 4 kg/h and the polymer withdrawn from the reactor had a melt flow rate $MFR_2$ of 0.27 g/10 min and an ethylene content of 4.0% by weight. The split of the polymer produced in the loop and the first gas phase reactors to the polymer produced in the second gas phase reactor was 94:6.

The polymer withdrawn from the reactor was mixed with effective amounts of Irgafos 168, Irganox 1010 and calcium stearate. In addition 5000 ppm Irganox 1030, 20000 ppm MB39 orange and 2000 ppm CMB Green 6028 was added to the composition based on the weight of the polymer. The mixture of polymer and additives was then extruded to pellets by using a ZSK70 extruder (product of Coperion) under nitrogen atmosphere. The melt temperature was 280° C. and SEI was 247 kWh/ton.

Examples 2 to 7

The procedure of Example 1 was followed except that the operation conditions in the loop reactor and the gas phase reactor were modified as shown in Table 1.

Comparative Examples 1 and 2

The procedure of Example 1 was repeated except that the process was operated with conditions shown in Table 1 and that the second gas phase reactor was not used.

TABLE 1

Polymerization conditions and some properties measured from the polymer

| | Example | | | | | | | | |
|---|---|---|---|---|---|---|---|---|---|
| | 1 | 2 | 3 | 4 | 5 | 6 | 7 | CE1 | CE2 |
| Al/Ti | 740 | 590 | 750 | 750 | 570 | 500 | 740 | | |
| Al/Don | 13 | 13 | 14 | 13 | 14 | 14 | 14 | | |
| Prepol Temperature, ° C. | 33 | 45 | 38 | 35 | 30 | 30 | 29 | 26 | 26 |
| Loop Temperature, ° C. | 72 | 72 | 72 | 72 | 70 | 71 | 70 | 68 | 68 |
| Loop $H_2/C_3$ mol/kmol | 0.53 | 0.52 | 0.74 | 0.49 | 0.59 | 0.52 | 2.0 | 0.14 | 0.15 |
| Loop $C_2/C_3$ mol/kmol | 8.7 | 7.2 | 7.4 | 7.6 | 7.8 | 7.7 | 7.8 | 12.2 | 12.6 |
| Loop $MFR_2$, g/10 min | 0.87 | 0.77 | 1.1 | 0.68 | 0.5 | 0.42 | 2.5 | 1.9 | 2.1 |
| Loop $C_2$-content % by weight (mole) | 3.1 (4.6) | 2.7 (4.0) | 2.6 (3.9) | 2.6 (3.9) | 3.2 (4.7) | 3.1 (4.6) | 3.1 (4.6) | 4.8 (7.0) | 5.1 (7.5) |
| Loop XS, % by weight | 5.1 | ND | ND | ND | 5.1 | 5.2 | 5.1 | 10 | 10 |
| GPR1 Temperature, ° C. | 80 | 80 | 80 | 80 | 80 | 80 | 80 | 70 | 70 |
| GPR1 Pressure, Bar | 29 | 29 | 20 | 20 | 20 | 20 | 22 | 27 | 27 |
| GPR1 $H_2/C_3$ mol/kmol | 1.9 | 2 | 1.9 | 1.7 | 2.1 | 1.4 | 2.5 | 15 | 15 |
| GPR1 $C_2/C_3$ mol/kmol | 33.3 | 33 | 31 | 33 | 34 | 34 | 35 | 20.1 | 20.2 |
| GPR1 $MFR_2$, g/10 min | 0.36 | 0.36 | 0.42 | 0.31 | 0.31 | 0.23 | 0.84 | 0.21 | 0.22 |
| GPR1 $C_2$-content % by weight (mole) | 3.7 (5.5) | 3.4 (5.0) | 3.1 (4.6) | 3.3 (4.9) | 3.3 (4.9) | 3.6 (5.3) | 3.6 (5.3) | 3.8 (5.6) | 4.0 (5.9) |
| GPR1 XS, % by weight | 4.5 | 6.3 | 5.0 | ND | ND | 6.5 | 5.5 | ND | ND |
| Split, Loop:gpr | 41:59 | 34:66 | 41:59 | 42:58 | 47:53 | 52:48 | 50:50 | 65:35 | 67:33 |
| GPR2 Temperature, ° C. | 80 | 80 | 70 | 80 | 65 | 65 | 65 | N/A | N/A |
| GPR2 Pressure, Bar | 24 | 18 | 17 | 20 | 22 | 18 | 17 | N/A | N/A |
| GPR2 $H_2/C_3$ mol/kmol | 0.47 | 1.6 | 1.5 | 1.3 | 0.65 | 1.6 | 1.7 | N/A | N/A |
| GPR2 $C_2/C_3$ mol/kmol | 50 | 175 | 295 | 105 | 50 | 175 | 175 | N/A | N/A |
| Final $MFR_2$, g/10 min | 0.27 | 0.28 | 0.33 | 0.26 | 0.25 | 0.19 | 0.61 | 0.21 | 0.22 |
| Final $C_2$-content % by weight (mole) | 4.0 (5.9) | 5.1 (7.5) | 5.4 (7.9) | 4.2 (6.2) | 3.7 (5.5) | 4.9 (7.2) | 4.5 (6.6) | 3.8 (5.6) | 4.0 (5.9) |
| Final XS, % by weight | ND | ND | ND | 8.1 | 5.3 | 11.6 | 9.1 | 7.4 | 7.4 |
| Split (Loop + gpr1):gpr2 | 94:6 | 89:11 | 91:9 | 92:8 | 93:7 | 90:10 | 93:7 | N/A | N/A |
| Total catalyst productivity, kg PP/g cat | 72 | 63 | 66 | 63 | 38 | 36 | 46 | 33 | 28 |

N/A = not applicable;
ND = not determined;

TABLE 2

The properties of the polymer components

| | Example | | | | | | | | |
|---|---|---|---|---|---|---|---|---|---|
| | 1 | 2 | 3 | 4 | 5 | 6 | 7 | CE1 | CE2 |
| $MFR_2$ (1), g/10 min | 0.87 | 0.77 | 1.1 | 0.80 | 0.50 | 0.50 | 2.5 | 0.13 | 0.14 |
| $MFR_2$ (2), g/10 min* | 0.20 | 0.25 | 0.23 | 0.18 | 0.21 | 0.12 | 0.31 | 0.55 | 0.6 |

TABLE 2-continued

The properties of the polymer components

| | Example | | | | | | | | |
|---|---|---|---|---|---|---|---|---|---|
| | 1 | 2 | 3 | 4 | 5 | 6 | 7 | CE1 | CE2 |
| $MFR_2$ (3), g/10 min* | 0.007 | 0.05 | 0.04 | 0.04 | 0.008 | 0.04 | 0.02 | — | — |
| $C_2$ (1), % by weight (mole) | 3.1 (4.6) | 2.7 (4.0) | 2.6 (3.9) | 3.0 (4.4) | 3.2 (4.7) | 3.1 (4.6) | 3.1 (4.6) | 4.8 (7.0) | 5.1 (7.5) |
| $C_2$ (2), % by weight (mole)* | 4.1 (6.0) | 3.8 (5.6) | 3.4 (5.0) | 3.8 (5.6) | 3.4 (5.0) | 4.1 (6.0) | 4.1 (6.0) | 1.9 (2.8) | 1.8 (2.7) |
| $C_2$ (3), % by weight (mole)* | 9 (13) | 19 (26) | 29 (38) | 15 (20) | 9 (13) | 17 (24) | 19 (26) | | |
| $MFR_2$ (gpr1)/$MFR_2$ (loop) | 0.41 | 0.47 | 0.38 | 0.46 | 0.62 | 0.55 | 0.34 | | |
| $MFR_2$ (gpr2)/$MFR_2$ (gpr1) | 0.75 | 0.78 | 0.79 | 0.84 | 0.81 | 0.83 | 0.73 | | |
| $C_2$ (loop)/$C_2$ (gpr1) | 0.84 | 0.79 | 0.84 | 0.79 | 0.97 | 0.86 | 0.86 | | |
| $C_2$ (gpr1)/$C_2$ (gpr2) | 0.93 | 0.67 | 0.57 | 0.79 | 0.89 | 0.73 | 0.80 | | |

The values denoted with * are calculated.

TABLE 3

Mechanical properties of polymers

| | Example | | | | | | | |
|---|---|---|---|---|---|---|---|---|
| | 1 | 2 | 3 | 4 | 5 | 6 | 7 | CE2 |
| Charpy impact, $kJ/m^2$ | 8.2 | 31 | 17 | 17 | 6.7 | 12 | 9.9 | 8.0 |
| Flexural modulus, MPa | 1000 | 830 | 861 | 861 | 1029 | 843 | 894 | 790 |

The invention claimed is:

1. A process for polymerizing propylene in the presence of a polymerization catalyst comprising
    (I) a solid catalyst component comprising a magnesium halide, a titanium halide and an internal electron donor; and
    (II) a cocatalyst comprising an aluminium alkyl and optionally an external electron donor, said process comprising the steps of:
    (A) continuously polymerizing propylene, optionally together with ethylene as a comonomer, in a first polymerization stage by introducing streams of propylene, hydrogen and optionally ethylene comonomer into the first polymerization stage at a temperature of from 60 to 100° C. and a pressure of from 10 to 100 bar to produce a first polymer of propylene and a first fluid reaction mixture wherein the first polymer has a melt flow rate $MFR_2$ of from 0.3 to 5.0 g/10 min;
    (B) withdrawing from the first polymerization stage a stream comprising the first polymer of propylene and passing it into a second polymerization stage;
    (C) continuously polymerizing propylene in the presence of said first polymer of propylene in the second polymerization stage at a temperature of from 65 to 100° C. and a pressure of from 10 to 100 bar by introducing streams of propylene, hydrogen, and ethylene, to produce a first polymer mixture of said first polymer of propylene and a second copolymer of propylene, said first polymer mixture comprising from 30 to 60% by weight of said first polymer and from 40 to 70% by weight of said second copolymer wherein the first polymer mixture has a melt flow rate $MFR_2$ of 0.05 to 1.0 g/10 min and a content of ethylene units of from 2 to 12% by mole and wherein the melt flow rate $MFR_2$ of said first polymer mixture is smaller than the melt flow rate $MFR_2$ of said first polymer and the content of ethylene units in said first polymer mixture is greater than the content of ethylene units in said first polymer;
    (D) withdrawing a stream comprising the first polymer mixture from the second polymerization stage and passing it into a third polymerization stage;
    (E) continuously polymerizing propylene and ethylene in the presence of the first polymer mixture in the third polymerization stage at a temperature of from 65 to 100° C., a molar ratio of ethylene to propylene of from 100 to 350 mol/kmol and a pressure of from 10 to 100 bar by introducing streams of propylene, hydrogen, and the comonomer, to produce a second copolymer mixture comprising the first polymer mixture and a third copolymer of propylene wherein the second copolymer mixture has a melt flow rate $MFR_2$ of 0.05 to 1.0 g/10 min and a content of ethylene units of from 4.5 to 15% by mole; wherein the second copolymer mixture comprises from 75 to 98% by weight of said first polymer mixture and from 2 to 25% by weight of said third copolymer and wherein the melt flow rate $MFR_2$ of the second copolymer mixture is smaller than the melt flow rate $MFR_2$ of said first polymer mixture and the ratio of the content of the ethylene units in the first polymer mixture to the content of the ethylene units in the second copolymer mixture, both expressed in mol-%, is within the range of from 0.50 to 0.96;
    (F) withdrawing a stream comprising the second copolymer mixture from the third polymerization stage and optionally mixing the second copolymer mixture with additives; and
    (G) extruding the second polymer mixture into pellets.

2. The process according to claim 1 wherein the first polymer is a propylene ethylene copolymer and wherein the first polymer contains from 0.1 to 6 mol-% of units derived from ethylene.

3. The process according to claim 1, wherein the first polymer is a propylene ethylene copolymer and wherein the first polymer contains from 0.1 to 6 mol-% of units derived from ethylene and the first copolymer mixture is a mixture of copolymers of propylene and ethylene and wherein the first copolymer mixture has a content of ethylene units of from 2 to 12 mol-%.

4. The process according to claim 1, wherein the first polymerization stage is conducted in a loop reactor as a slurry polymerization step.

5. The process according to claim 1, wherein the first polymerisation stage is conducted in a loop reactor as a slurry polymerisation step and wherein the loop reactor is operated at a temperature within the range of from 60 to 75° C.

6. The process according to claim 1, wherein the second and third polymerization stages are conducted in gas phase reactors.

7. The process according to claim 1, wherein the second and third polymerization stages are conducted in gas phase reactors and the gas phase reactors are operated at a temperature within the range of from 65 to 85° C.

8. The process according to claim 1, wherein the first polymerization stage is conducted in a loop reactor as a slurry polymerization step and wherein the second and third polymerization stages are conducted in gas phase reactors and wherein the slurry stream comprising the first polymer and the first fluid reaction mixture withdrawn from the loop reactor is passed into the gas phase reactor of the second polymerization stage.

9. The process according to claim 1, wherein the ratio of the melt index $MFR_2$ of the first copolymer mixture to the melt index $MFR_2$ of the first polymer, $MFR_{2,b1}/MFR_{2,1}$, has a value of not higher than 0.8.

10. The process according to claim 1, wherein the first polymer is a propylene ethylene copolymer and wherein the first polymer contains from 0.1 to 6 mol-% of units derived from the ethylene and the first polymer mixture is a mixture of copolymers of propylene and ethylene and wherein the first copolymer mixture has a content of the ethylene units of from 2 to 12 mol-% and wherein the ratio of the ethylene content of the first polymer to the ethylene content of the first copolymer mixture, both expressed in mol-%, $C_1/C_{b1}$, is not higher than 0.98.

11. The process according to claim 1, wherein the ratio of the melt index $MFR_2$ of the second polymer mixture to the melt index $MFR_2$ of the first polymer mixture, $MFR_{2,b2}/MFR_{2,b1}$, has a value of not higher than 0.95.

12. The process according to claim 1, wherein the first polymer is a propylene ethylene copolymer and wherein the first polymer contains from 0.1 to 6 mol-% of units derived from ethylene and the first copolymer mixture is a mixture of copolymers of propylene and ethylene and wherein the first copolymer mixture has a content of ethylene units of from 2 to 12 mol-% and wherein the ratio of the content of ethylene units in the first copolymer mixture to the content of the ethylene units in the second copolymer mixture, both expressed in % by mole, is within the range of 0.55 to 0.95.

13. The process according to claim 1, wherein the solid component of the polymerization catalyst comprises a transition metal component comprising magnesium, titanium and halogen, and a polymeric component comprising polymer of a vinyl compound of the formula $CH_2=CH—CHR_6R_7$, wherein $R_6$ and $R_7$ together form a 5- or 6-membered saturated, unsaturated or aromatic ring or independently represent an alkyl group comprising 1 to 4 carbon atoms.

14. The process according to claim 1, wherein the solid component of the polymerization catalyst comprises a transition metal component comprising magnesium, titanium and halogen, and a polymeric component comprising polymer of a vinyl compound of the formula $CH_2=CH—CHR_6R_7$, which vinyl compound is vinyl cyclohexane or 3-methyl-1-butene.

15. The process according to claim 1, wherein the content of ethylene units in the third copolymer is from 10 to 40% by mole and a content of propylene units of from 60 to 90% by mole.

16. A process for producing pipes of polymerized propylene comprising:
1) polymerizing propylene in the presence of a polymerization catalyst comprising
   (I) a solid catalyst component comprising a magnesium halide, a titanium halide and an internal electron donor; and
   (II) a cocatalyst comprising an aluminium alkyl and optionally an external electron donor, said process comprising the steps of:
   (A) continuously polymerizing propylene, optionally together with ethylene, in a first polymerization stage by introducing streams of propylene, hydrogen and optionally ethylene into the first polymerization stage at a temperature of from 60 to 100° C. and a pressure of from 10 to 100 bar to produce a first polymer of propylene and a first fluid reaction mixture wherein the first polymer has a melt flow rate $MFR_2$ of from 0.3 to 5.0 g/10 min;
   (B) withdrawing from the first polymerization stage a stream comprising the first polymer of propylene and passing it into a second polymerization stage;
   (C) continuously polymerizing propylene in the presence of said first polymer of propylene in the second polymerization stage at a temperature of from 65 to 100° C. and a pressure of from 10 to 100 bar by introducing streams of propylene, hydrogen, and ethylene, to produce a first polymer mixture of said first polymer of propylene and a second copolymer of propylene, said first polymer mixture comprising from 30 to 60% by weight of said first polymer and from 40 to 70% by weight of said second copolymer wherein the first polymer mixture has a melt flow rate $MFR_2$ of 0.05 to 1.0 g/10 min and a content of ethylene units of from 2 to 12% by mole and wherein the melt flow rate $MFR_2$ of said first polymer mixture is smaller than the melt flow rate $MFR_2$ of said first polymer and the content of ethylene units in said first polymer mixture is greater than the content of ethylene units in said first polymer;
   (D) withdrawing a stream comprising the first polymer mixture from the second polymerization stage and passing it into a third polymerization stage;
   (E) continuously polymerizing propylene and ethylene in the presence of the first polymer mixture in the third polymerization stage at a temperature of from 65 to 100° C., a molar ratio of ethylene to propylene of from 100 to 350 mol/kmol and a pressure of from 10 to 100 bar by introducing streams of propylene, hydrogen, and the comonomer, to produce a second copolymer mixture comprising the first polymer mixture and a third copolymer of propylene wherein the second copolymer mixture has a melt flow rate $MFR_2$ of 0.05 to 1.0 g/10 min and a content of ethylene units of from 4.5 to 15% by mole; wherein the second copolymer mixture comprises from 75 to 98% by weight of said first polymer mixture and from 2 to 25% by weight of said third copolymer and wherein the melt flow rate $MFR_2$ of the second copolymer mixture is smaller than the melt flow rate $MFR_2$ of said first polymer mixture and the ratio of the content of the ethylene units in the first polymer mixture to the content of the ethylene units in the second copolymer mixture, both expressed in mol-%, is within the range of from 0.50 to 0.96;

(F) withdrawing a stream comprising the second copolymer mixture from the third polymerization stage and optionally mixing the second copolymer mixture with additives; and 2) extruding the second polymer mixture, optionally comprising additives, to form a pipe.

\* \* \* \* \*